United States Patent [19]

Stephenson

[11] 3,761,698

[45] Sept. 25, 1973

[54] COMBINED DIGITAL MULTIPLICATION SUMMATION

[75] Inventor: Charles M. Stephenson, Dallas, Tex.

[73] Assignee: Texas Instruments Incorporated, Dallas, Tex.

[22] Filed: Apr. 24, 1972

[21] Appl. No.: 247,037

Related U.S. Application Data

[63] Continuation of Ser. No. 88,209, Nov. 9, 1970, abandoned, which is a continuation of Ser. No. 562,386, July 1, 1966, abandoned.

[52] U.S. Cl................... 235/164, 235/176, 235/181

[51] Int. Cl........................... G06f 7/52, G06f 15/34

[58] Field of Search.................... 235/164, 176, 156, 235/181

[56] References Cited

UNITED STATES PATENTS

| | | | |
|---|---|---|---|
| 3,407,357 | 10/1968 | Spanderfer et al. | 235/176 X |
| 3,449,553 | 6/1969 | Swan | 235/181 X |

OTHER PUBLICATIONS

C. S. Wallace, "A Suggestion For a Fast Multiplier" IEEE Trans. on Computers, Feb. 1964, pp. 14–17.

*Primary Examiner*—Eugene G. Botz
*Assistant Examiner*—David H. Malzahn
*Attorney*—James O. Dixon et al.

[57] ABSTRACT

An arithmetic unit for combined digital multiplication and summation of the form A+B·C using operands A, C and D is disclosed without using discrete intermediate storage of any sum of any particular product. Electrical signals are generated representative of the digital functions A, C and D. A plurality of pseudoadders are connected into a plurality of levels in converging combinational logic paths for producing an ultimate sum from the digital functions C and D and then electrical signals representative of the function A are introduced following the formation of the ultimate sum to form an output signal representative of the sum A and the ultimate sum.

7 Claims, 7 Drawing Figures

INVENTOR
CHARLES M. STEPHENSON
ATTORNEY

INVENTOR
CHARLES M. STEPHENSON

ATTORNEY

INVENTOR
CHARLES M. STEPHENSON

D. Carl Richards
ATTORNEY

COMBINED DIGITAL MULTIPLICATION SUMMATION

This application is a continuation of application S.N. 88,209, filed Nov. 9, 1970, now abandoned, which is a continuation of application S.N. 562,386, filed July 1, 1966, now abandoned.

This invention relates to digital computing operations and more particularly to the injection of a signal of predetermined character into the flow of electrical signals produced in the course of parallel multiplication primarily for producing the sum of two signals, one of which involves a product of two other signals.

In data handling operations involving use of digital computers, certain classes of operations involve such a repetition of a particular mathematical step as to unduly burden computers constructed and programmed to operate in a conventional mode. The present invention minimizes this burden and is particularly useful, for example, in connection with processing of seismic data wherein functions such as autocorrelation functions and cross-correlation functions are treated. Digitized seismograms form time series which represent earth vibrations detected by seismic detectors following generation as by the detonation of an explosive charge. Processing thereof often requires the repetitive multiplication and summation of samples of the seismic signal at selected time intervals. For example, the production of the autocorrelation functions from a 24 trace seismogram involves many millions of computations which basically are of the form A+C·D in order to provide the autocorrelation functions. Such operations may be of the type discussed generally in *Geophysics*, Volume XXIX, October 1964, page 792 et seq. Simplification of the foregoing operation, where repeated so many times, has been found to be highly desirable.

The present invention involves a computer structure and the operation of a computer to provide high speed parallel multiplication plus addition in a single operation. Such an operation is thus readily employed and highly desirable where autocorrelation functions or crosscorrelation functions are to be evaluated.

More particularly, and in accordance with the present invention, there is provided a method of performing the operation A+C·D in a digital machine without intermediate storage of any sum of any partial product. The method involves generating digital electrical functions representative of A, C, and D. A continuous flow of digital electrical signals is then initiated and maintained until an ultimate sum is produced by producing at each of a plurality of levels electrical signals representative of the sums of the partial products of the digital representations C and D wherein the partial products and the sums thereof are taken in sets of two. A digital representation of A is injected into the flow of electrical signals to form an output signal representative of the sum of A and the ultimate sum. The output signal is then stored. In a preferred embodiment of the invention, the multiplier (C or D) is partitioned into two-bit segments and recoded in digital form to maximize the zeros in the multiplier prior to initiating the flow of the digital electrical signals.

For a more complete understanding of the present invention and for further objects and advantages thereof, reference may now be had to the following description taken in conjunction with the accompanying drawings in which.

Figure 1:
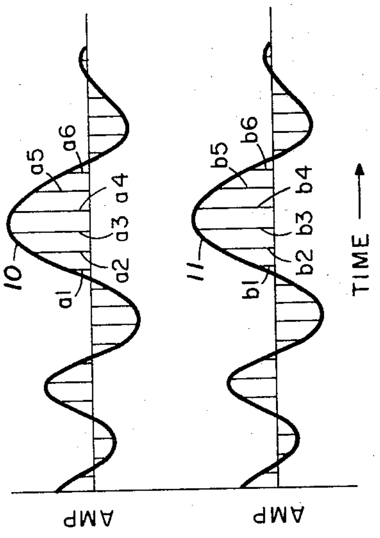
FIG. 1 illustrates a correlation operation as between two waveforms.

In order to illustrate the use of the present invention, consider the operation wherein the correlation function as between the two time variable signals 10 and 11 of FIG. 1 are to be evaluated. The correlation function is obtained in accordance with the expression:

$$\phi(\tau) = (1)/(T_2 - T_1) \int_{\tau}^{T} g(t)g(t+\tau)\,dt. \qquad (1)$$

Figure 2:
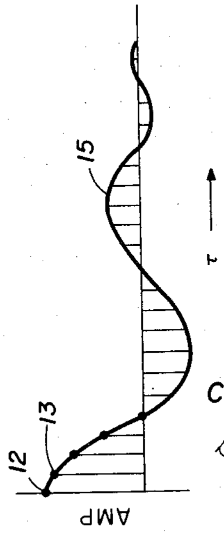
FIG. 2 illustrates a representative correlation function for the two waveforms of FIG. 1.

The correlation function may thus be obtained by multiplying the sample a1 of the waveform 10 by the sample b1 of the waveform 11. In the next operation, the samples *a*2 and *b*2 are multiplied and the product is added to the product of the first operation. Thereafter, the samples *a*3 and *b*3 are multiplied and the product is added to the last sum. This is continued for the time samples throughout the length of the signals 10 and 11. Each resultant sum is carried throughout the entire process by multiplying and summing with the previous sums. The final sum then represents one point, the point at $\tau=0$ of the autocorrelation function 15, FIG. 2, wherein amplitude is plotted as a function of $\tau$. Such a point may be represented by the point 12. The waveforms 10 and 11 are then shifted one relative to the other by an increment $\tau$ and the entire series of multiplication and summation is then repeated to evaluate the point 13 on the autocorrelation function. This operation is then repeated until the waveforms have been moved relative to each other in steps of $\tau$ totaling the entire length thereof. For each series of operations one point on the correlation function is evaluated. The foregoing operation demonstrates the multiplicity of operations involving the evaluation of the quantity A+C·D. It is an operation of this nature to which the present invention is primarily directed.

Figure 3:
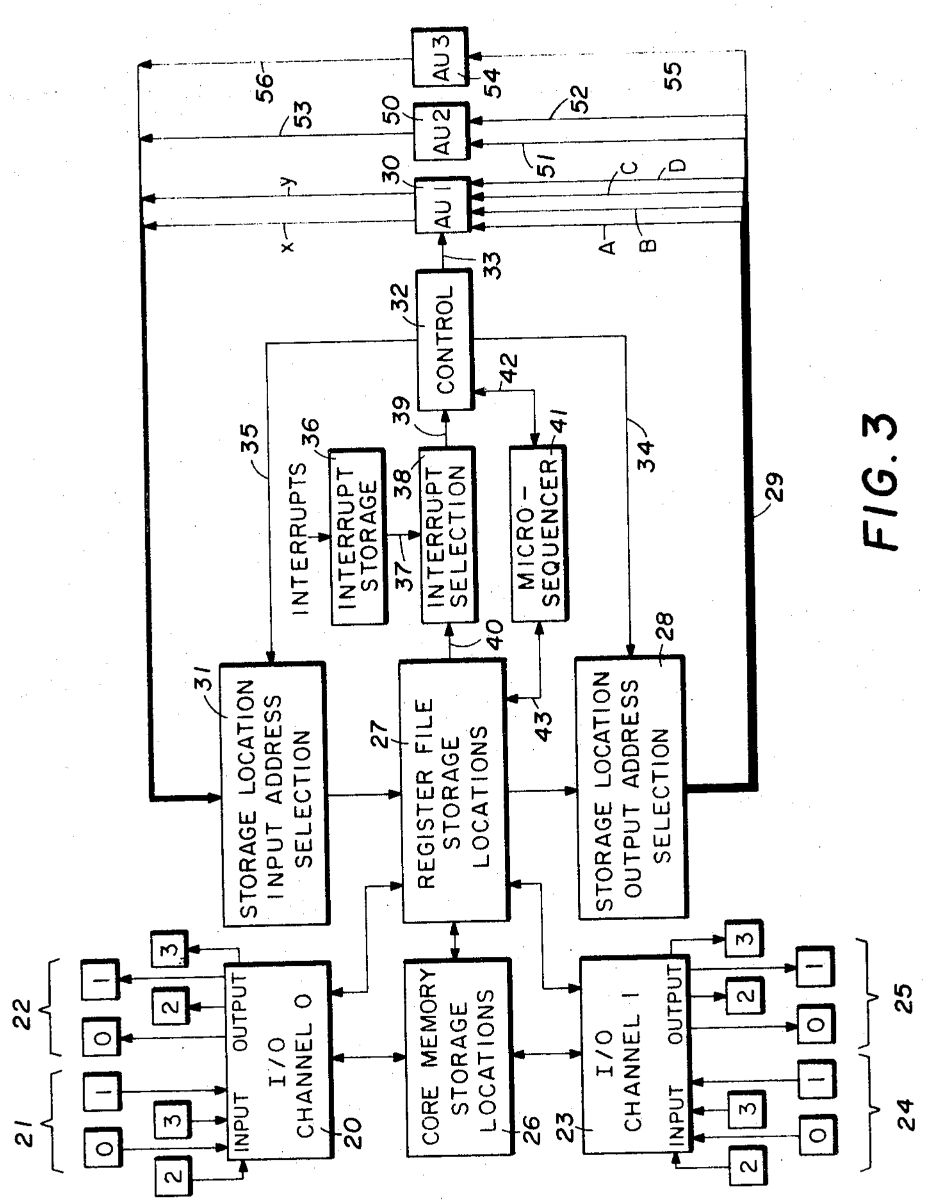
FIG. 3 is a block diagram of a data processing system embodying the present invention.

In FIG. 3, a general purpose digital computer embodying the present invention has been shown in block form and includes a first input-output channel 20 having input devices 21 individually identified as devices 0–3. Channel 20 also has output devices 22 identified individually as 0–3. A second and independent input-output channel 23 is likewise provided with input devices 24 and output devices 25. A core storage 26 is accessible to both channels 20 and 23 and is also accessible to a register file 27. Register file 27 also is accessible from the channels 20 and 23.

A storage location output address selector 28 is provided for applying data from the register file 27 by way of channels 29 to an arithmetic unit 30. The arithmetic unit 30 has four input channels A, B, C, and D. The unit 30 has two output channels X and Y. The output channels X and Y lead to a storage location input address selector 31.

A control unit 32 is coupled directly to the arithmetic unit 30 by way of channel 33 and to the selectors 28 and 31 by way of channel 34 and 35, respectively. An interrupt storage unit 36 is coupled by way of channel 37 to an interrupt selector unit 38. The interrupt selector unit 38 is coupled by way of channel 39 to the control unit 32. The register file 27 is coupled to the interrupt selector unit 38 by way of channel 40.

A microsequencer 41 is coupled by way of channel 42 to the control unit 32 and to the register file 27 by way of channel 43.

A second arithmetic unit 50 has two input channels 51 and 52 and a single output channel 53. A third arithmetic unit 54 has a single input channel 55 and a single output channel 56.

The structure illustrated in FIG. 3 has been described in order to provide a setting for the computer components that are particularly involved in connection with the present invention. The multiplication and summation operation of the present invention is primarily related in the system of FIG. 3 to the arithmetic unit 30. Input data such as may represent the successive time samples of the waveforms 10 and 11 are stored in the core memory 26 as 24-bit words. Selected words as required for evaluation of functions, such as the autocorrelation function above described, are then accessed from memory 26 and stored in the register file 27. The memory 26 is arranged in two separate stacks so that when a word ($n$) is called for, the word ($n$) is acquired from one stack simultaneously with the word ($n$+1) from the other stack. By this means, both multiplier and multiplicand are accessed from memory in one memory cycle. A multiplicand and a multiplier thus stored in the file 27 are applied to the arithmetic unit 30 by way of channels C and D. On a first operation the quantities A and B are zero, so that a double word length product appears and is applied by way of channels X and Y to the register file.

A second output signal is then formed by accessing a second pair of data words from core memory 26 to the register file 27. The new multiplicand and multiplier and the sum from the first operation are then applied to the arithmetic unit 30 by way of channels D, C and A and B, respectively. In a single operation, the new product-plus-sum is produced at the output of the arithmetic unit 30 for storage in the register file 27. The latter operation is repeatedly performed carrying a new sum each time to the register file and applying such new sum together with two new data words accessed from core memory 26 until the entire series has been evaluated to provide a final or output quantity representative of a given point on an autocorrelation function, for example.

Figure 4:
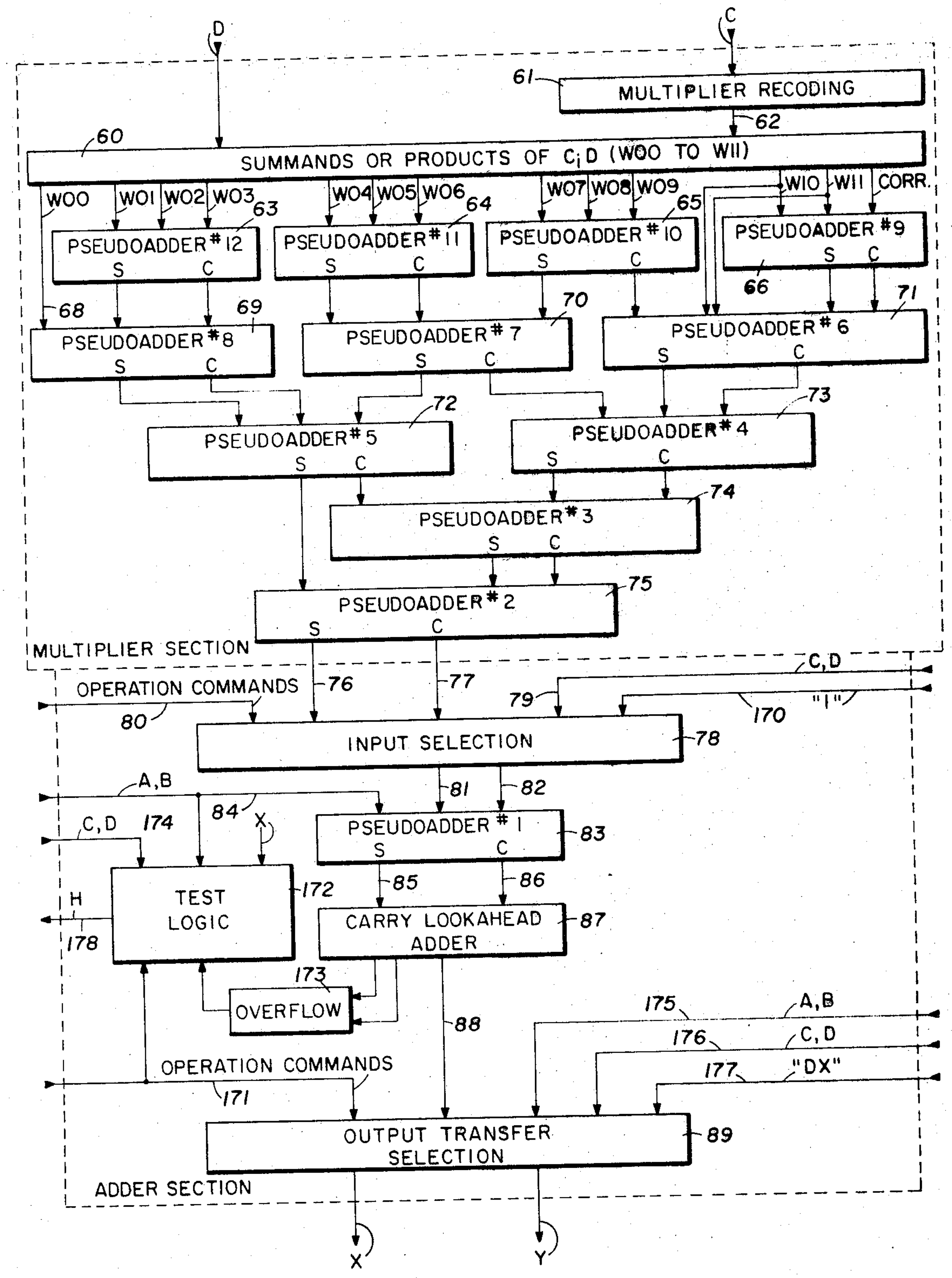
FIG. 4 is a functional diagram of a multiplication-and-add system involving operation of the arithmetic unit AU1 of FIG. 3.

With this explanation of the setting for the present invention, reference should now be had to FIG. 4. In FIG. 4, the flow of data has been illustrated for performing the operation A,B+C·D in a digital machine. The operation is characterized by the absence of any intermediate storage of any of the sums of partial products of the multiplicand D and the multiplier C. It is further characterized by the injection into the flow of data of a function representative of the quantity A,B.

More particularly, in accordance with the invention, the multiplicand channel D leads to a summands unit 60. The multiplier channel C leads to a multiplier recoding unit 61. The output of the recoding unit is coupled by way of channel 62 to the second input of the summands unit 60. The system of FIG. 4 will carry out the multiplication of two 24-bit binary numbers.

By way of example, there will now be described a corresponding operation for multiplication of two six-bit numbers, following which the operation of the system of FIG. 4 will further be described.

Consider the multiplication of two six-bit binary numbers:

TABLE I

| | | | | | | | | | | | | | | |
|---|---|---|---|---|---|---|---|---|---|---|---|---|---|---|
| MULTIPLICAND | = | | | | | | 0 | 1 | 1 | 0 | 1 | 0 | = | 26 |
| MULTIPLIER | = | | | | | | 0 | 1 | 1 | 1 | 0 | 1 | = | × 29 |
| PP1 | | | | | | | 0 | 1 | 1 | 0 | 1 | 0 | | 234 |
| PP3 | | | | | 0 | 1 | 1 | 0 | 1 | 0 | | | | 52 |
| PP4 | | | | 0 | 1 | 1 | 0 | 1 | 0 | | | | | 754 |
| PP5 | | 0 | 0 | 1 | 1 | 0 | 1 | 0 | | | | | | |
| | | 0 | 1 | 0 | 1 | 1 | 1 | 1 | 0 | 0 | 1 | 0 | | 754 |

where PP1 through PP6 are the partial products. PP2 and PP6 are not shown because they affect the product only in determining the position of the next higher order partial product. The product of two binary numbers may be expressed as the summation of the partial products, provided the summation is performed with all partial products in their proper position.

Normally, the product is formed by the addition of PP1 and PP2 to form a partial sum PS1. The second partial sum PS2 then would be formed from the addition of PS1 and PP3 until all partial products have been summed.

Each successive addition requires that a carry, PC1, be propagated for each step. The addition of PP1 and PP2 in Table II requires that a carry word PC1 be generated:

TABLE II

| | |
|---|---|
| PC1 | 1 1 1 1 0 0 0 0 |
| PP1 | 0 0 0 1 1 0 1 0 |
| PP2 | 0 1 1 0 1 0 0 0 |
| PS1 | 1 0 0 0 0 0 1 0 |

In cascading of the carry terms, PC1, to a higher order adder to generate the next sum and carry means, the addition time is the sum of the propagation delay through each adder stage and constitutes the largest portion of time required to accomplish the addition.

When the cascading of carries is avoided in the successive additions of partial products, a substantial increase in multiplier speed is achieved. This is accomplished in the present invention.

The carry chain of combinational logic is broken at each adder input with the result that pseudosum and pseudocarry words are generated in place of PC1 and PS1, i.e., as in Table III.

TABLE III

| | |
|---|---|
| PP1 | 0 0 0 1 1 0 1 0 |
| PP2 | 0 1 1 0 1 0 0 0 |
| PPS1 | 0 1 1 1 0 0 1 0 |
| PPC1 | 0 0 0 1 0 0 0 0 |

where PPS1 is the pseudosum and PPC1 is the pseudocarry.

Successive pseudoadditions are performed such that the accumulated sum is determined at any time by the addition of the accumulated pseudosum and pseudocarry.

The multiplication speed is increased by avoiding the propagation of carries while summing the partial products until the last pseudosum and carry is generated.

An additional increase in speed is achieved by the use of carry lookahead logic in the final addition.

The structure of such a multiplier-adder approach is shown in FIG. 4. The multiplier consists of three sections:

I. the logic to form the partial products;

II. the pseudoadder or pseudoadders; and

III. the pseudoadder and a lookhead carry propagation adder.

A carry save method in its simplest form would involve only one pseudoadder and storage elements used for accumulated pseudosums and carries. The three inputs to such pseudoadder would be:

1. the last stored pseudosum;
2. the last stored pseudocarry; and
3. the next partial product.

Each pass through such adder would dispose of one partial product except for the initial pass which could be implemented to dispose of three partial products.

The time required to accomplish a multiplication with the carry save operations would be $n-2$ clock periods plus the lookahead addition time where n is the number of partial products.

However, in this invention, more than one partial product is formed at one time. The use of a family of pseudoadders is required. That is, one pseudoadder is employed to sum each partial product.

In FIG. 4, the addition of more and more partial products per sequential step has been cpntinued until a'l partial products are summed in one step which permits the formation of the product without storage elements since the pseudosum and carry from the last pseudoadder includes the sum of all partial products. This is accomplished without discrete intermediate storage of any partial product. Discrete storage as used herein shall mean an operation where an input is applied to an element and an output results and remains after removal of the input. FIG. 4 involves operations on 24-bit words rather than the six-bit words of the foregoing example.

In accordance with the present invention, and in order to carry out the multiplication, four pseudoadders 63–66 have three inputs each coupled to 12 outputs leading from the summands unit 60. The outputs W01, W02, and W03 are connected to pseudoadder 63; outputs W04, W05, and W06, to pseudoadder 64; outputs W07, W08, and W09, to pseudoadder 65; and outputs W10, W11, and correction output CORR. are applied to pseudoadder 66.

Output W00 is applied by way of channel 68 to pseudoadder 69 along with the sum output and the carry output respectively from pseudoadder 66. The sum and carry outputs from pseudoadder 64 are applied to two inputs of pseudoadder 70 along with the sum output from pseudoadder 65. The carry output from pseudoadder 65 and the sum and carry outputs from pseudoadder 66 are applied to pseudoadder 71. Thus, adders 69–71 make up the second level.

Pseudoadders are units 72 and 73 in a third level. In a fourth level is the pseudoadder 74, and in a fifth level is pseudoadder 75. The sum and carry outputs from adder 69 are applied to adder 72 along with the sum output from adder 70. The carry output from adder 70 along with the sum and carry outputs from adder 71 are applied to adder 73. The carry output from the adder 72 and the sum and carry outputs from adder 73 are applied to the adder 74. The sum output from adder 72 and the sum and carry outputs from adder 74 are applied to the adder 75. The sum and carry outputs from the adder 75 are coupled by way of channels 76 to two inputs of an input selector unit 78.

The double length word C,D may be applied by way of channel 79 to the input selector 78. An operation command channel 80 is also coupled to the input selector unit 78. Two output channels 81 and 82 from the unit 78 are applied to a pseudoadder 83. The double length word A,B is also applied to the pseudoadder 83 by way of channel 84. The output of adder 83 is applied by way of channels 85 and 86 to a carry-lookahead adder 87. Channel 88 then leads from the adder 87 to an output transfer unit 89, whose output channels are the X and Y channels of FIG. 3.

In the system thus far described, the multiplicand D, the multiplier C, and the word A,B are applied as input data to the unit. The appearance of such data at the input of the summands unit 60 and on channel 84 immediately initiates a flow of digital electrical signals through the continuously narrowing tree of pseudoadders down to the pseudoadder 83 at which point the sum of all of the partial products of the multiplier and multiplicand is summed with the word A,B. By this means, there appears on the output channels 85 and 86, digital signals representative of the quantity A,B+C·D. A and B are each 24-bit words and, as signified by the notation A,B are in the form of one double length word. The sums of the partial products are words of length varying between 26 and 48 bits, as will be more fully explained, with the final sum in the form of a 48-bit word.

The multiply operation is characterized by the initiation and maintaining of a continuous flow of digital electrical signals in parallel through the pseudoadder tree until an ultimate sum is produced at the output of the pseudoadder 75. The operation is further characterized by the production at each of a plurality of levels in the tree of electrical signals representative of the sums of the partial products of the digital representations of C and D. The partial products and sums thereof are taken in sets of two. Finally, the word A,B is injected into the flow path to form an output signal representative of the sum of A,B and the ultimate sum resulting from the partial product. The output from the adder 83 is then stored.

Preferably, the method is characterized by an operation in the recoding unit 61 in which the multiplier is partitioned into two-bit segments and recoded in digital form to maximize the zeros in the multiplier prior to initiating data flow through the pseudoadder tree.

The structure of the summands unit 60 of FIG. 4 is indicated in Table IV. Table IV shows the digit position of each element in the multiplier as well as the pseudoadder system and particularly the number of adder circuits included in each of the pseudoadders of FIG. 4.

TABLE IV

COMPUTER READOUT DOCUMENTATION

FOR ARITHMETIC UNIT

| | | | | | | | | | | | | | |
|---|---|---|---|---|---|---|---|---|---|---|---|---|---|
| 47 | W-------- | | | | | W-------- | -------- | -------- | W------ | ------ | W-- | W-- | W |
| 46 | 1W | | | | | S-------- | -------- | -------- | S------ | ------ | S-- | S-- | S |
| 45 | 11 | | | | | 6C | | | S------ | ------ | S-- | S-- | S |
| 44 | X0W | | W | | | X6 | W | | 4C | W | S | S | S |
| 43 | XX9 | | W | | | XX | W | | X4 | W | 3C | 2C | 1C |
| 42 | XXXW | | S | | | XX | S | | XX | S | X3 | X2 | X1 |
| 41 | XXX8 | | 1C | | | XX | S | | XX | S | XX | XX | XX |
| 40 | XXXXW | | 01 | | | XX | S | | XX | S | XX | XX | XX |
| 39 | XXXX7 | | X0 | | | XX | S | | XX | S | XX | XX | XX |
| 38 | XXXXXW | | XX | W | | XX | S | | XX | S | XX | XX | XX |
| 37 | XXXXX6 | | XX | W | | XX | 7C | | XX | S | XX | XX | XX |
| 36 | XXXXXXW | | XX | S | | XX | X7 | | XX | S | XX | XX | XX |
| 35 | XXXXXX5 | | XX | 1C | | XX | XX | | XX | S | XX | XX | XX |
| 34 | XXXXXXXW | | XX | 11 | | XX | XX | | XX | S | XX | XX | XX |
| 33 | XXXXXXX4 | | XX | X1 | | XX | XX | | XX | S | XX | XX | XX |
| 32 | XXXXXXXXW | | XX | XX | W | XX | XX | W | XX | S | XX | XX | XX |
| 31 | XXXXXXXX3 | | XX | XX | W | XX | XX | W | XX | 5C | XX | XX | XX |
| 30 | XXXXXXXXXW | | XX | XX | S | XX | XX | S | XX | X5 | XX | XX | XX |
| 29 | XXXXXXXXX2 | | XX | XX | 1C | XX | XX | S | XX | XX | XX | XX | XX |
| 28 | XXXXXXXXXXW | | XX | XX | 21 | XX | XX | 8C | XX | XX | XX | XX | XX |
| 27 | XXXXXXXXXX1 | | XX | XX | X2 | XX | XX | X8 | XX | XX | XX | XX | XX |
| 26 | XXXXXXXXXXXW | | XX | XX | XX | XX | XX | XX | XX | XX | XX | XX | XX |
| 25 | WXXXXXXXXXX0 | | XX | XX | XX | XX | XX | XX | XX | XX | XX | XX | XX |
| 24 | 1XXXXXXXXXXC | S | XX | XX | XX | XX | XX | XX | XX | XX | XX | XX | XX |
| 23 | 1WXXXXXXXXXX | 9C | XX | XX | XX | XX | XX | XX | XX | XX | XX | XX | XX |
| 22 | K1WWWWWWWWWW | X9 | XX | XX | XX | XX | XX | XX | XX | XX | XX | XX | XX |
| 21 | K09876543210 | XX | XX | XX | XX | XX | XX | XX | XX | XX | XX | XX | XX |
| 20 | WWWWWWWWWWW | SC | SC | SC | SC | SC | SC | SC | SC | SC | SC | SC | SC |
| 19 | 19876543210 | 99 | 11 | 11 | 11 | 66 | 77 | 88 | 44 | 55 | 33 | 22 | 11 |
| 18 | 0KXXXXXXXXX | KX | 00 | 11 | 22 | XX | XX | XX | XX | XX | XX | XX | XX |
| 17 | KXXXXXXXXX | KK | XX | XX | XX | XX | XX | XX | XX | XX | XX | XX | XX |
| 16 | KKXXXXXXXX | KK | XX | XX | XX | XX | XX | XX | XX | XX | XX | XX | XX |
| 15 | KKXXXXXXXX | KK | XX | XX | XX | XX | XX | XX | XX | XX | XX | XX | XX |
| 14 | XXXXXXX | KK | KX | XX | XX | XX | XX | XX | XX | XX | XX | XX | XX |
| 13 | XXXXXXX | KK | K | XX | XX | KX | XX | XX | XX | XX | XX | XX | XX |
| 12 | KXXXXXX | KK | K | XX | XX | KK | XX | XX | XX | XX | XX | XX | XX |
| 11 | KXXXXXX | | K | XX | XX | KK | XX | XX | XX | XX | XX | XX | XX |
| 10 | KKXXXXX | | K | XX | XX | KK | XX | XX | XX | XX | XX | XX | XX |
| 9 | KKXXXXX | | K | XX | XX | KK | XX | XX | XX | XX | XX | XX | XX |
| 8 | XXXX | | K | KX | XX | KK | XX | XX | XX | XX | XX | XX | XX |
| 7 | XXXX | | | | XX | KK | KX | XX | XX | XX | XX | XX | XX |
| 6 | KXXX | | | | XX | | K | XX | KX | XX | XX | XX | XX |
| 5 | KXXX | | | | XX | | K | XX | KK | XX | XX | XX | XX |
| 4 | KKXX | | | | XX | | K | XX | KK | XX | XX | XX | XX |
| 3 | KKXX | | | | XX | | K | XX | KK | XX | XX | XX | XX |
| 2 | X | | | | KX | | K | XX | KK | XX | XX | XX | XX |
| 1 | X | | | | KK | | K | XX | KK | XX | XX | XX | XX |
| 0 | | | | | | | | | | | | | OVERFLOW |
| ab | cdefghijklmn | op | qr | st | uv | wx | yz | aa bb | cc dd | ee ff | gg hh | ii jj | kk ll |

TABLE V

MULTIPLIER STRUCTURE SHOWING

ADDER INPUTS AND OUTPUTS

```
   I    I    I          I    I    I          I    I    I          I    I    I     I
CORR W11  W10          W9   W8   W7         W6   W5   W4         W3   W2   W1     I
   I    I    I          I    I    I          I    I    I          I    I    I     I
                                                                                  I
XADDER NO 9 X   XADDER NO 10X   XADDER NO 11X   XADDER NO 12X                     I
                                                                                  I
       I        I        I          I        I       I          I       I         I
      C9       S9       C10        S10      C11     S11        C12     S12       W0
       I        I        I          I        I       I          I       I         I

  X   ADDER   NO. 6   X    X   ADDER   NO. 7   X       X   ADDER   NO. 8  X

              I        I         I            I          I        I
             C6       S6        C7           S7         C8       S8
              I        I         I            I          I        I

          X   ADDER    NO.   4   X        X   ADDER      NO.    5   X

                I          I                  I           I
               C4         S4                 C5           I
                I          I                  I           I
                                                          I
             X    ADDER     NO.     3       X             I
                                                          I
                          I          I                    I
                         C3         S3                   S5
                          I          I                    I

                        X         ADDER       NO.       2       X

                                    I           I
                                   C2          S2
                                    I           I

                        X                                     X- C -
                        X       INPUT          GATING         X- D -
                        X                                     X

                                    I           I
                                  INPS        INPC
                                    I           I

      ——A AND B ——————X          ADDER         NO. 1          X

                                    I           I
                                   C1          S1
                                    I           I

                        X    LOOKAHEAD          ADDER          X

                                          I
                                        SUMZ
```

Table IV is a computer readout documentation for the pseudoadder structure of the arithmetic unit 30 of FIG. 3.

Table V further illustrates the multiplier structure showing the various adder inputs and outputs and, like Table IV, is a computer readout documentation of the multiplier structure.

In Table V, the numbers in the left column denote the digital position of the adder as related to the two-level lookahead adder at the trunk of the tree. The inputs of each adder stage are denoted by the first three signatures. The sum output from each adder is noted and is next followed by the carry output. The carry output is more significant than the sum output. Therefore, the carry output is assigned a lower number in order to indicate that it will be an adder input at the given position.

In Table IV, columns a and b specify the digit position, spanning two 48 digits. Columns *c–n* illustrate a positional array of the digits in twelve partial products of the 24-bit multiplicand D and the recoded 24-bit multiplier C. Columns o and p represent a 13th summand which is for recoding correction. Thus, in columns *c–p*, there are thirteen summands that are to be applied to an adder tree.

The adders take inputs three at a time. Thus, for the first level in the adder tree, four pseudoadders are required; in the second level, three pseudoadders are required; in the third level, two pseudoadders; and in the fourth level, only one pseduoadder is employed. In a fifth level, one pseudoadder provides for injection of the data word A,B for a final summation in the multiplication-and-add operation.

The succesive pairs of columns, starting with column *g* and extending to column 11, Table IV; are used to define the number of adder circuits required in each of the pseudoadders. More particularly, consider pseudoadder No. 12, which comprises unit 63 of FIG. 4. From Table IV it will be understood that the structure in pseudoadder 12 is dictated by column *u*. One adder circuit will be required in pseudoadder No. 12 for each occurrence in column *u* of a numeral or letter other than the letter K. From FIG. 4, it will be noted that words W01, W02, and W03 are applied to pseudoadder No. 12. In Table IV, numerals and letters occupy columnn m from digit position 3 to digit position 28 and in column *k* forming word W03, from digit position 7 to digit position 32. Thus, the pseudoadder No. 12 will require one adder circuit for each digit position between and including digit positions 3 and 32 or a total of thirty adder circuits.

Column 1, containing word WO2, bit positions 3 and 4 are occupied by K's. Similarly, in column *k*, bit positions 3–6 are occupied by K's. In the notation of Table IV, the presence of a K in any column means that the most significant bit in the column in which the K appears is copied at the K position.

Each of the other pseudoadders Nos. 1–11 will be implemented as to the number of units and the connections thereto as specified in Table IV.

Tables IV and V thus provide an index to the number of and interconnections between adder circuits in the various pseudoadder units of FIG. 4.

Figures 5, 7:
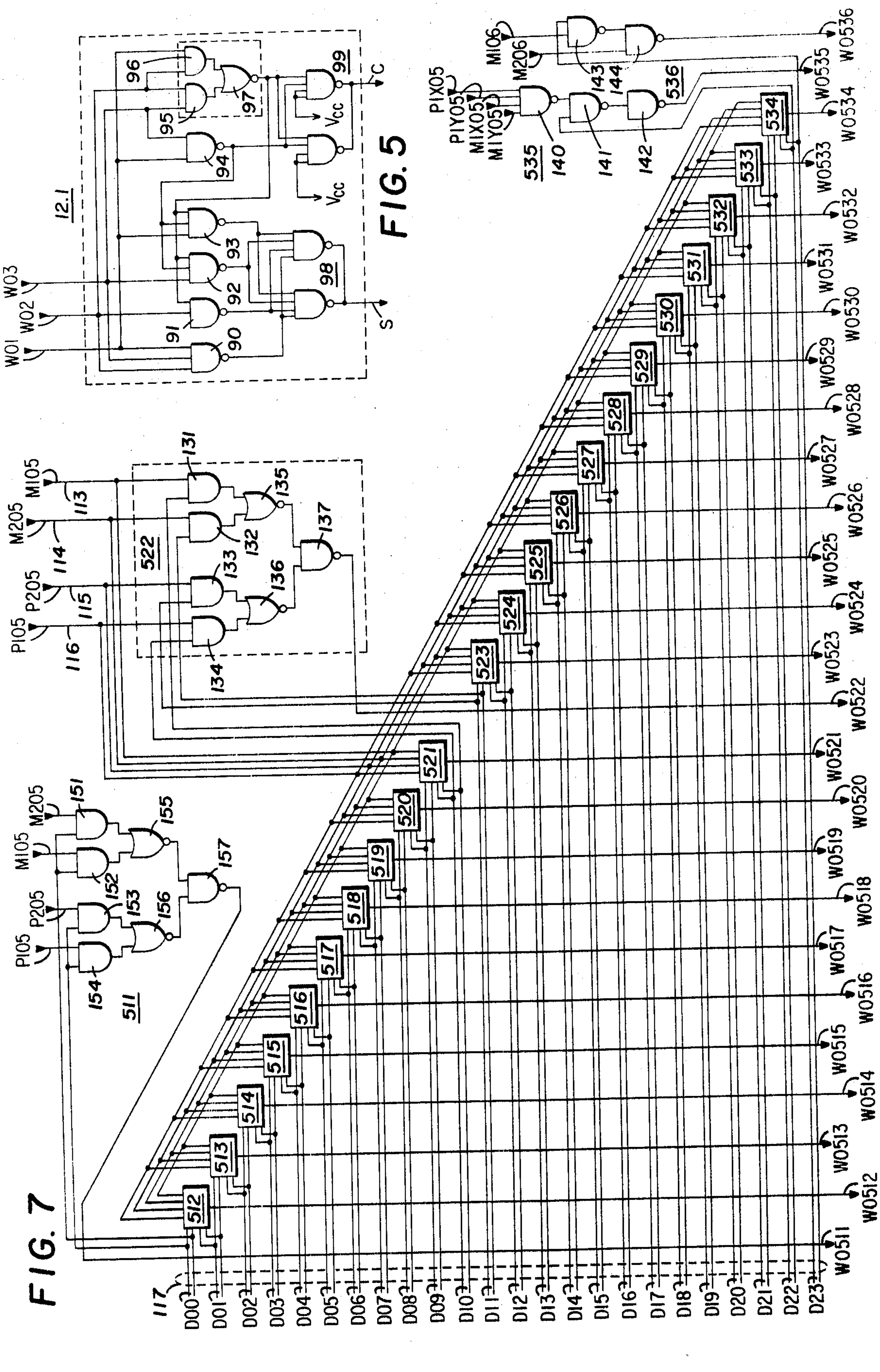
FIG. 5 illustrates a pseudoadder module employed in the adder tree of FIG. 4.
FIG. 7 illustrates the summands element SO5 of FIG. 6.

FIG. 5 illustrates an adder circuit module structure that is repeated in each of the adders in accordance with the structure required by Table IV. Pseudoadder No. 12 of FIG. 4 will include thirty adder circuits, each of which is identical with that shown in FIG. 5 but interconnected in the manner indicated in Tables IV and V.

Referring to FIG. 5, one adder circuit from pseudoadder No. 12 of FIG. 4 has been illustrated. The individual adder circuits in each of the pseudoadders of FIG. 4 will be of the same construction except that where not needed for power purposes, one of the output drivers may be omitted. The three input channels apply bits from summands W01, W02, and W03 to the pseudoadder 12.1. The unit 12.1 includes four NAND elements. The sum of the three input summands bits appears on the output channel S and the carry appears on the output channel C.

The unit 12.1 includes NAND elements 90–94 and an "exclusive NOR" unit made up of AND elements 95 and 96 and NOR element 97. While having an exclusive NOR configuration the circuit is not so used. More particularly, the sum output is derived from a driver stage 98 which in turn is driven by the NAND elements 90–93. The carry output is derived from a driver stage 99 which in turn is driven by the NAND element 94 and the NOR element 97.

Bits from all three input words W01, W02, and W03 are supplied to the input of NAND element 90.

NAND element 91 is driven by a bit from input word W02 and the output of NOR element 97.

NAND element 92 is supplied at its input with a bit from word W03, the output of NAND element 94, and the output of NOR element 97.

NAND element 93 is supplied at its input with a bit from word W01, the output of NAND element 94, and the output of NOR element 97.

The output NAND units 90-93 are "NANDED" in the input of the driver stage 98.

The NAND element 94 is supplied at its input with bits from words W03 and W02.

The AND element 96 is supplied at its input with bits from words W01 and W02. The outputs of AND elements 95 and 96 are applied to the NOR element 97 to complete the exclusive NOR logic.

The remainder of the circuits in the pseudoadders in FIG. 4 have the same construction as the circuit of FIG. 5, except that they work upon the specific inputs identified in FIG. 4 taken with Table IV.

Figure 6:
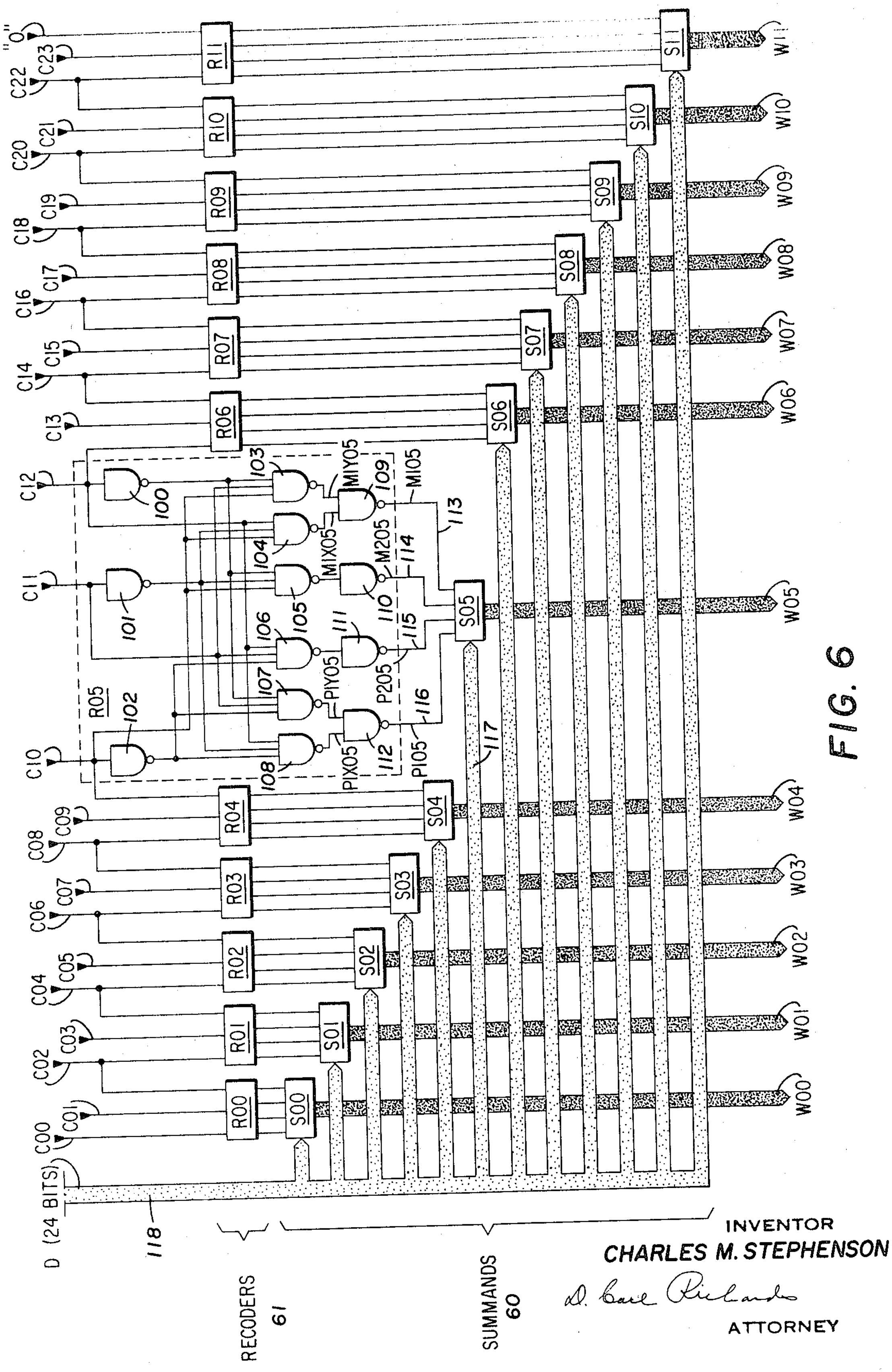
FIG. 6 illustrates the recoding unit of FIG. 4 in relation to the summands unit.

FIG. 6 illustrates the operative relationship between the recoder unit 61 and the summands unit 60 of FIG. 4. The recoder 61 includes 12 units R00–R11. The least significant digits of the 24-bit input word C are applied to the unit R11 and the most significant bits of the input word C are applied to the unit R00. More particularly, a zero level signal is applied along with bits C23 and C22 to unit R11. Bits C22, C21, and C20 are applied to unit R10. The remaining bits in the 24-bit word C are similarly applied to the remaining units with bits C02, C01, and C00 being applied to unit R00. The units R00-R11 are all identical in construction. Representative unit R05 has been shown in detail with the remainder of the units being shown in block form only.

Unit R05 has three inputs C12, C11, and C10. Input C12 is applied to an inverter 100; input C11, to an inverter 101; and input C10, to inverter 102. The inputs as well as the outputs of inverters 100–102 then go through two levels of logic including NAND units 103–108 in the first level and NAND units 109–112 in the second level. Four output lines 113–116 serve as input lines leading to the summand unit S05.

It will be noted that the 24-bit word D is applied by way of channels 117 to the summands unit S05. The logic in the unit R05 operates such that not more than one of the four output lines 113–116 will be true for any input. It will be recognized that under some circumstances, none of the output lines 113–116 will be true. The lines 113–116 when true respectively produce an operation in summand unit S05, as set out in Table VI.

TABLE VI

1. Line 113 true: S05 inverts word q to form output word W05;
2. Line 114 true: S05 shifts left and inverts word D;
3. Line 115 true: S05 shifts left and copies word D; and
4. Line 116 true: S05 copies word D.

The equations describing the operation of each of the units R00–R11 are as follows:

$$\mathbf{10}\cdot\overline{11}\cdot 12 + \mathbf{10}\cdot 11\cdot\overline{12} = M1 = \text{Invert} \quad (2)$$

$$\mathbf{10}\cdot\overline{11}\cdot\overline{12} = M2 = \text{Shift left and invert} \quad (3)$$

$$\overline{\mathbf{10}}\cdot 11\cdot 12 = P2 = \text{Shift left} \quad (4)$$

$$\overline{\mathbf{10}}\cdot\overline{11}\cdot 12 + \overline{\mathbf{10}}\cdot 11\cdot\overline{12} = P1 = \text{Copy} \quad (5)$$

By use of the recoder 61, the 24-bit input word C effectively is reduced to twelve bits at the inputs of the units S00–S11.

It will be noted that the 24-bit word D is applied by way of 24 channels 118 to 24 channels 117 leading to unit S05 as well as to like channels leading to all of the other summands units S00–S11.

Each of the units S00–S11 produces 26-bit output words W00–W11. The latter output words are then applied to the pseudoadder tree as indicated in FIG. 4.

FIG. 7 illustrates construction of one of the summand units of FIG. 6. More particularly, the summand unit S05 has been shown with elements 512–521 and 523–534 thereof in block form and elements 511, 522, 535 and 536 in schematic form.

The channels 117 are shown in FIG. 7 as applying the twenty-four bits D00-D23 of the input word D to elements 511–536 as well as the complements thereof. Only the bit lines have been labeled, with the complement lines being unlabeled. The summand unit S05 includes identical logic elements 512–534 which are all of the same construction as unit 522. All of elements 512–534 have as inputs four lines 113–116 leading from logic unit R05 of FIG. 5. Element 512 serves to form the bit W0512, the 26-bit output word from summand unit S05. Similarly, the element 534 operates to form the output bit W0534. Element 511 differs in construction from element 512 and has been shown in detailed circuit form with an output channel on which the bit W0511 appears. Similarly, element 535 is of construction differing from the rest of the elements and has an output channel on which the bit W0535 appears. Element 536 is of unique construction and has an output channel on which bit W0536 appears. The output words W00-W11 of FIG. 5 are each 26-bit words having an extra bit on the most significant end in order to permit shift left and having an extra bit on the least significant end in order to correct for the recoding operation in unit 61.

The element 522 has as inputs from channels 117 the bits D10, D11, $\overline{\mathbf{D10}}$ and $\overline{\mathbf{D11}}$. It also has four inputs from unit RO5, i.e., the signals on lines 113–116. The element 522 has a first level of AND gates 131–134 and a second level including NOR gates 135 and 136 and a final level formed by a NAND gate 137. The gates 131–136 interconnected as shown are manufactured and sold as a module by Texas Instruments Incorporated of Dallas, Tex., and identified as a Dual Exclusive OR Gate, Catalog No. SN 5450.

With the four D inputs present and with not more than one of the input lines 113–116 being true, there is produced on the output line 138 a signal properly representing the bit W522 as keyed by the unit R05. Each of the elements 512–534 performs the same function as element 522 except that they operate on different buts of the input word D.

The element 511 is of the same construction as element 522 except that it operates only on bit D00. More particularly, the D inputs to AND gates 151 and 152 both receive the bit $\overline{\mathbf{D00}}$. Similarly, the AND gates 153 and 154 both receive the bit D00. Thus, the output from the NAND gate 157 in element 511 is the bits W0511.

The element 535 includes three NAND gates 140, 141, and 142 interconnected in different logic levels. The four inputs to NAND gate 140 are derived from the ouputs of the first logic level in unit R05, namely, outputs P1X05, P1Y05, M1X05, and M1Y05, respectively. The bit D23 and the output from NAND gate 140 are applied to NAND gate 141 whose output in turn is applied to NAND gate 142 which serves as an inverter. The output of element 535 is thus the least significant bit in the output word W05.

A final bit W0536 appears in word W05 and is used, as is understood in the art, to correct the word W06 from ones complement to twos complement notation. The correction bit W0536 is formed by employing NAND gates 143 and 144 in two logic levels with bits $\overline{\mathbf{D23}}$ and signal M106 being applied to NAND gate 143, and the output of NAND gate 143 and signal $\overline{\mathbf{M206}}$ being applied to the second level NAND gate 144. The signal on the output channel leading from NAND gate 144 thus represents the correction bit W0536.

What is claimed is:

1. An arithmetic unit for combined digital multiplication and summation of the form A+C·D using independent operands A, C and D without discrete intermediate storage of any sum of any partial product comprising:

a. means for generating electrical signals representative of digital functions A, C and D, b. a multiplier recoding unit to recode said electrical signal representative of C, c. a summands unit to combine said electrical signal representative of D and the output of said multiplier recoding unit into a set of partial products, d. a family of pseudoadders for summing the partial products from said summands unit, each of said pseudoadders including a plurality of adder circuits, each adder circuit adapted for adding bits of data to produce a sum and carry output bit, said adder circuits having, 1. a first, second and third input, 2. a first nand circuit having said first, second and third inputs applied thereto,
3. a fifth circuit having said first and third inputs applied thereto,
4. an exclusive nor circuit having said first, second and third inputs applied thereto,
5. a second nand circuit having said second input and the output from said exclusive nor circuit applied thereto,
6. a fourth nand circuit having said first input, the output from said fifth nand circuit and the output from said exclusive nor circuit applied thereto,
7. a third nand circuit having said third input, the output from said fifth nand circuit, and the output from said exclusive nor circuit applied thereto,
8. a sixth nand circuit having the outputs from said first, second, third and fourth nand circuits applied thereto to produce a sum output from said adder circuit, and
9. a seventh nand circuit having the outputs of said fifth nand circuit and said exclusive nor circuit applied thereto to produce a carry output from said adder circuit, e. exclusively combinational logic means responsive to and initiated by said electrical signals representative of digital functions C and D including said family of pseudoadders for maintaining a continuous flow of digital electrical signals in converging combinational logic paths of said pseudoadders for production of an ultimate sum with the production at each of a plurality of pseudoadder levels of electrical signals representative of the sums of the partial products of the digital representations of C and D wherein said sums of partial products progressively decrease in number along said path to produce an ultimate sum representative of C·D in the form of a sum and carry pair, and
f. combinational logic means for introducing into said flow of electrical signals following formation of said ultimate sum said function representative of A to form an output signal representative of the sum of A and said ultimate sum.

2. The system according to claim 1 wherein a register file is coupled to receive each said output signal and to introduce a first said output signal as the function A with the formation of a second pair of electrical functions C and D.

3. The system according to claim 1 including:

a. means including a register file selectively coupled to said multiplier recoding unit and summands unit for applying thereto as functions C and D successive time sample representations of two time series for which the correlation function thereof is to be evaluated,
b. means to couple said register file to receive and store each said output signal, and
c. a control means coupled to said register file to introduce into said flow of electrical signals following formation of said ultimate sum said output signal for a first pair of representations of said time series as the function A simultaneously with application to said multiplier recoding unit and summands unit as functions C and D a second pair of representations of said pair of time series.

4. An arithmetic unit for combined digital multiplication and summation of the form A+B·D without discrete intermediate storage of any sum of any partial product wherein A is an operand representing a prior summation A+B·D, which comprises:

a. means digitally to generate electrical signals representative of digital functions A, C, and D, and to form a series of multi-bit words representative of summands of C and D,
b. a pseudoadder tree having inputs for receiving a plurality of multi-bit words representative of summands of C and D, each pseudoadder of said tree including a plurality of adders, each of said adders having
1. a first, second and third input,
2. a first nand circuit having said first, second and third inputs applied thereto,
3. a fifth nand circuit having said first and third inputs applied thereto,
4. an exclusive nor circuit having said first, second and third inputs applied thereto,
5. a second nand circuit having said second input and the output from said exclusive nor circuit applied thereto,
6. a fourth nand circuit having said first input, the output from said fifth nand circuit and the output from said exclusive nor circuit applied thereto,
7. a third nand circuit having said third input, the output from said fifth nand circuit, and the output from said exclusive nor circuit applied thereto,
8. a sixth nand circuit having the outputs from said first, second, third and fourth nand circuits applied thereto to produce a sum output from said adder circuit, and
9. a seventh nand circuit having the outputs of said fifth nand circuit and said exclusive nor circuit applied thereto to produce a carry output from said adder circuit, c. control means for initiating a continuous flow exclusively at the propagation velocity through combinational logic of digital electrical signals through said tree until production of an ultimate sum in the form of a sum and carry pair by producing at each of a plurality of pseudoadder levels electrical signals representative of the partial sums of said summands,
d. means for introducing into said flow of electrical signals following production of said ultimate sum the function representative of A to form an output signal representative of the sum of A and said ultimate sum, and
e. means for storing said output signal.

5. A system of performing the operation A+C·D, which comprises:

a. means for generating electrical signals representative of digital physical functions, A, C, and D,
b. combinational logic means for generating digitally all of the partial products of said functions C and D,
c. pseudoadder tree means for generating digital sums of said partial products at each of a plurality of pseduoadder levels with means for simultaneously generating all sums at any level in said pseudoadders, each pseudoadder of said tree including a plurality of adders, each of said adders having
1. a first, second and third input, 2. a first nand circuit having said first, second and third inputs applied thereto,
3. a fifth nand circuit having said first and third inputs applied thereto,
4. an exclusive nor circuit having said first, second and third inputs applied thereto,
5. a second nand circuit having said second input and the output from said exclusive nor circuit applied thereto,
6. a fourth nand circuit having said first input, the output from said fifth nand circuit and the output from said exclusive nor circuit applied thereto,
7. a third nand circuit having said third input, the output from said fifth nand circuit, and the output from said exclusive nor circuit applied thereto,
8. a sixth nand circuit having the outputs from said first, second, third and fourth nand circuits applied thereto to produce a sum output from said adder circuit, and
9. a seventh nand circuit having the outputs of said fifth nand circuit and said exclusive nor circuit applied thereto to produce a carry output from said adder circuit, d. means for generating a digital output signal representative of the sum of A and the ultimate sum of said partial products without interruption of generation of said sums, and
e. means for storing said digital output signal.

6. In a signal correlation system for repeatedly performing combined digital multiplication and summation of the form A+C·D using independent operands A, C and D without intermediate storage of any sum of any partial product and having means for generating digital electrical functions A, C, and D and for forming partial products of C and D where C and D are representative of successive time samples of two signals to be correlated in accordance with the relationship $$\phi_{(\tau)}=\frac{1}{T_2-T_1}\int_{T_1}^{T_2} g(t)g(t+\tau)\,dt,$$

comprising:

a. pseudoadder means, for forming sums of said partial products, each pseudoadder of said pseudoadder means having a plurality of adders, each of said adders having
1. a first, second and third input,
2. a first nand circuit having said first, second and third inputs applied thereto,
3. a fifth nand circuit having said first and third inputs applied thereto,
4. an exclusive nor circuit having said first, second and third inputs applied thereto,
5. a second nand circuit having said second input and the output from said exclusive nor circuit applied thereto,
6. a fourth nand circuit having said first input, the output from said fifth nand circuit and the output from said exclsuive nor circuit applied thereto,
7. a third nand circuit having said third input, the output from said fifth nand circuit, and the output from said exclusive nor circuit applied thereto,
8. a sixth nand circuit having the outputs from said first, second, third and fourth nand circuits applied thereto to produce a sum output from said adder circuit, and
9. a seventh nand circuit having the outputs of said fifth nand circuit and said exclusive nor circuit applied thereto to produce a carry output from said adder circuit, b. means for initiating a first continuous flow of digital electrical signals representing first values of said two signals in parallel paths for production of an ultimate sum with means to produce at each of a plurality of pseudoadder levels electrical signals representative of the sums of the partial products of the digital representations of C and D wherein said partial products and sums thereof progressively decrease in number along said path to produce an ultimate sum representative of C·D,
c. means for introducing into said flow of electrical signals following formation of said ultimate sum the function representative of A to form an output signal representative of the sum of A and said ultimate sum, and
d. control means for initiating a second continuous flow wherein C and D represent second values of said two signals and wherein A represents said output signals.

7. An arithmetic unit for a digital computer which accommodates selectively repeated digital multiplication and summation of the form A, B+C·D using independent operands A, B, C and D without discrete intermediate storage of any sum of any partial product and having means for generating electrical signals representative of digital electrical functions A, B, C and D and for forming partial products of said signals representative of C and D where C and D may be representative of successive time samples of two signals to be correlated in accordance with the relationship $$\phi_{(\tau)}=\frac{1}{T_2-T_1}\int_{T_1}^{T_2} g(t)g(t+\tau)\,dt,$$

or the sum A,B+C·D or the difference A,B−C·D, comprising:

a. pseudoadder means, for forming sums of said partial products, each pseudoadder of said pseudoadder mean having a plurality of adders, each of said adders having
1. a first, second and third input,
2. a first nand circuit having said first, second and third inputs applied thereto,
3. a fifth nand circuit having said first and third inputs applied thereto,
4. an exclusive nor circuit having said first, second, and third inputs applied thereto,
5. a second nand circuit having said second input and the output from said exclusive nor circuit applied thereto,
6. a fourth nand circuit having said first input, the output from said fifth nand circuit and the output from said exclusive nor circuit applied thereto,
7. a third nand circuit having said third input, the output from said fifth nand circuit, and the output from said exclusive nor circuit applied thereto,
8. a sixth nand circuit having the outputs from said first, second, third and fourth nand circuits applied thereto to produce a sum output from said adder circuit, and
9. a seventh nand circuit having the outputs of said fifth nand circuit and said exclusive nor circuit applied thereto to produce a carry output from said adder circuit, b. combinational logic having inputs for digital words C and D including means for initiating a first continuous flow of digital electrical signals representing first values of C and D in converging paths for production of an ultimate sum with means to produce at each of a plurality of pseudoadder levels electrical signals representative of the sums of the partial products of the digital representations of C and D wherein said partial products and sums thereof progressively decrease in number along said path to produce an ultimate sum representative of C·D, c. an input selection unit having sum and carry input channels for said ultimate sum and input channels for said signals C,D and output channels, d. pseudoadder means having one pair of input channels connected to said selection unit and having an input channel for said signals A,B for introducing the function representative of A,B to form an output signal representative of the sum of A,B and the signal from said selection unit, and e. a control input for said selection unit to select as inputs one of said ultimate sum and C,D.

* * * * *